United States Patent [19]

Buchwald et al.

[11] 4,272,695

[45] Jun. 9, 1981

[54] BRUSH WEAR INDICATOR

[75] Inventors: Frank S. Buchwald, Beachwood; Richard C. Maher, Painesville; Jerome E. Buchina, Eastlake, all of Ohio

[73] Assignee: Towmotor Corporation, Mentor, Ohio

[21] Appl. No.: 15,094

[22] Filed: Feb. 26, 1979

Related U.S. Application Data

[63] Continuation-in-part of Ser. No. 845,764, Oct. 26, 1977, abandoned.

[51] Int. Cl.[3] .......................................... H02K 13/00
[52] U.S. Cl. .................................. 310/242; 310/245
[58] Field of Search ................ 310/239, 240, 242, 73, 310/246, 245, 247, 244, 248, 249

[56] References Cited

U.S. PATENT DOCUMENTS

| | | | |
|---|---|---|---|
| 1,277,394 | 9/1918 | Dean | 310/246 |
| 2,691,114 | 10/1954 | Lykins | 310/246 |
| 3,387,155 | 6/1968 | Krulls | 310/247 |
| 3,423,618 | 1/1969 | Schmid | 310/246 |
| 3,526,797 | 9/1970 | Jueschke | 310/245 |
| 4,024,525 | 5/1977 | Baumgartner | 310/245 |

*Primary Examiner*—R. Skudy
*Attorney, Agent, or Firm*—John W. Grant

[57] ABSTRACT

A brush wear indicator includes a first contactor and a second contractor movable relative to the first contactor from an open position to a closed position to connect an electrical circuit to an indicator. The second contactor is maintained in the open position against the resiliency of a leaf spring by a coil spring which urges a brush toward a commutator in response to wear to the brush. When the brush wears away to a preselected length the coil spring will have moved to a position at which the leaf spring is free to bias the second contactor to the closed position.

4 Claims, 3 Drawing Figures

BRUSH WEAR INDICATOR

DESCRIPTION

CROSS REFERENCE TO RELATED APPLICATION

This is a continuation-in-part of application Ser. No. 845,764 filed Oct. 26, 1977, by Frank S. Buchwald et al, now abandoned.

BACKGROUND OF THE INVENTION

Electrical machinery, such as direct current motors for example, uses brushes for transferring power between an electric circuit and a commutator. The brushes are in contact with the rotating commutator and during use wear and erode from such contact thereby causing them to shorten in length. The brushes must be replaced when sufficiently worn to prevent damage to the commutator and insure efficient power transfer. Some current devices signal when the brushes are sufficiently worn to need replacing but usually interfere with the movement or usability of the brush. It is desirable to have a device which signals when the brushes have been worn away to a length at which replacement of the brush is desirable and does not interfere with the movement of the brush.

SUMMARY OF THE INVENTION

The present invention is directed to overcoming one or more of the problems as set forth above.

According to the present invention a brush wear indicator having a brush box, a brush slidably connected to the brush box for translatory movement relative thereto, a mounting plate releasably connectable to the brush box, and a spring connected to the mounting plate and urging the brush in a preselected direction in response to wearing away of an end of the brush, includes a first contactor, a second contactor connected to the mounting plate and movable between a first position at which the second contactor is free from contact with the first contactor and a second position at which the second contactor is in engagement with the first contactor and means for biasing the second contactor to one of the first and second positions. The spring is movable between a first position at which the spring maintains the second contactor at the selected one of the first and second positions against the biasing influence of the biasing means and a second position at which the second contactor is free to move to the other of the first and second positions under the influence of the biasing means, the second position being indicia of a brush which has been worn to a preselected length at which replacement of the brush is desirable, the first position of the brush being indicia of a brush prior to its being worn to the preselected length.

DETAILED DESCRIPTION

Figure 1:
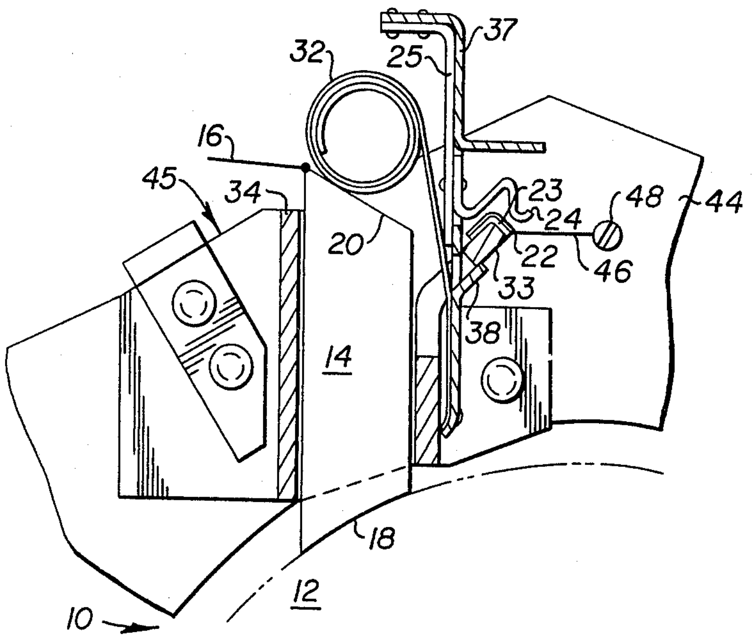
FIG. 1 is a diagrammatic, longitudinal cross section of a brush apparatus embodying the present invention.
Figure 2:
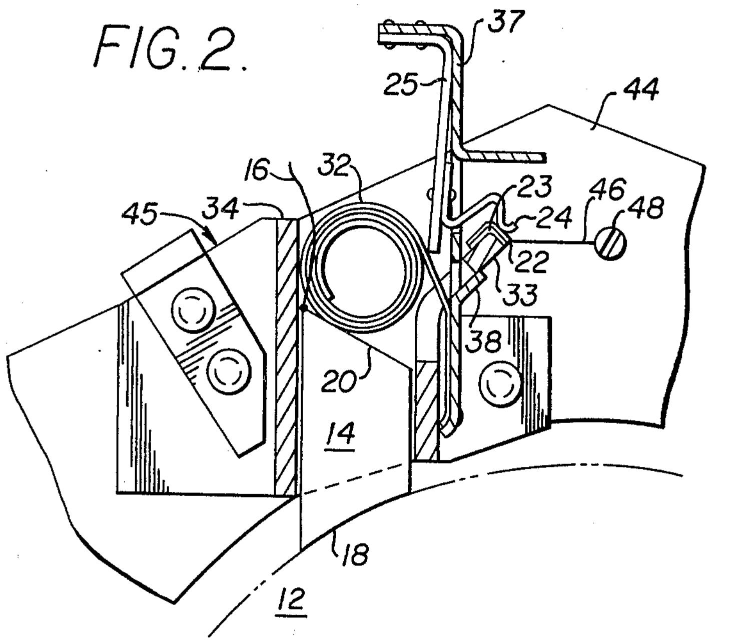
FIG. 2 is a diagrammatic view similar to FIG. 1 showing the positions of various components when the brush is worn to a preselected length.

Referring to FIGS. 1 and 2 an electric machine such as a direct current motor 10 for example, has a rotatable commutator 12 and a brush 14. The brush 14 transfers power between a power source or electric circuit 16 and the commutator 12.

The brush 14 is slidably positioned within a brush holder or box 34 and has first and second ends 18,20. The first end 18 is in sliding contact with the commutator 12 while the power source 16 is connected to the second end 20. The brush 14 is movable in a preselected direction toward commutator 12 in response to wearing away of the first end 18 of the brush 14. The brush box 34 is connected to an insulator 44 with the brush box 34 and insulator 44 together forming a brush box assembly 45. The brush box 34 is electrically conductive.

A mounting plate 37 is releasably connectable to the brush box 34 by means of a tab 38 engagable with a projection 33 of the brush box 34. A self-winding coil spring 32 has one end connected to the lower portion of mounting plate 37. The coil portion of the coil spring 32 bears against the second end 20 of the brush 14 such that spring 32 urges brush 14 in the preselected direction in response to wearing away of first end 18 of brush 14. The bias of coil spring 32 also maintains tab 38 in engagement with projection 33.

As the first end 18 of brush 14 wears away, the coil portion of coil spring 32 moves from the first position shown in FIG. 1 to the second position shown in FIG. 2. The second position of coil spring 32 is indicia of a brush which has been worn to a preselected shortened length at which replacement of the brush is desirable while the first position is indicia of a brush prior its being worn to said preselected length.

A first contactor 22 is connected to projection 33 of brush box 34 and is electrically insulated therefrom by an insulator 23 sandwiched between projection 33 and first contactor 22.

A second contactor 24 is connected to the mounting plate 37 by means of a leaf spring 25. The second contactor 24 is movable between a first or open position at which the second contactor is free from contact with first contactor 22 and a second or closed position at which the second contactor 24 is in engagement with first contactor 22. The leaf spring 25 functions as a means for biasing the second contactor to the second position. Alternatively, the leaf spring 25 and second contactor 24 can be formed as one piece.

Figure 3:
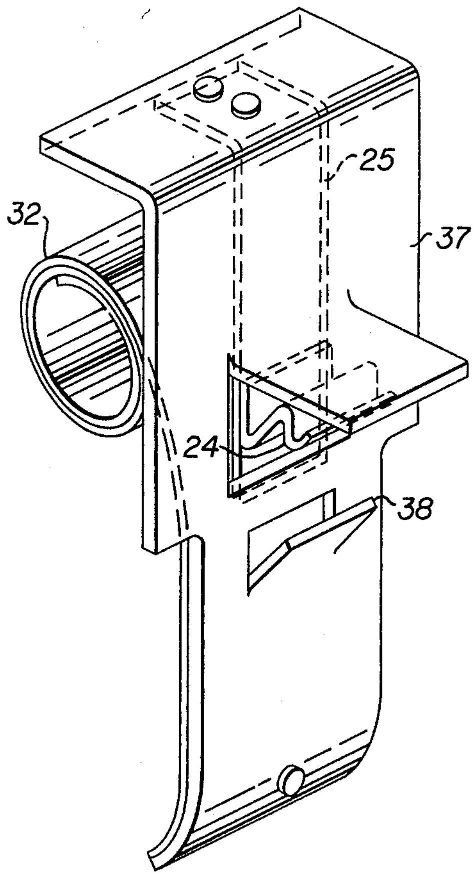
FIG. 3 is an isometric view of certain components of FIG. 1.

Referring to FIG. 3, mounting plate 37, coil spring 32, leaf spring 25, and second contactor 24 together form a unitary assembly.

At the first position of coil spring 32, the coil spring 32 abuts the lower portion of leaf spring 25 and thereby maintains the second contactor 24 in the open or first position against the biasing influence of leaf spring 25. As the brush 14 wears away and the coil portion of coil spring 32 moves to the second position, as shown in FIG. 2, the coil spring moves out of engagement with the leaf spring 25 which is then free to move the second contactor 24 into engagement with the first contactor 22. An electrical lead 46 is connected to the first contactor 22 and to a terminal mounting screw 48 connected to insulator 44. The terminal mounting screw is in turn connected to an indicator light, not shown, such that movement of second contactor 24 to the closed position in contact with the first contactor 22 completes an electrical circuit from the source 16 to the indicator light through brush 14, brush box 34, mounting plate 37, leaf spring 25, first and second contactors 22,24, electrical lead 46 and terminal screw 48.

Alternatively the first and second contactors 22,24 can be positioned such that at the first position of coil spring 32 (FIG. 1) the second contactor 24 is in contact with the first contactor 22 and moves away from contact therewith under the influence of leaf spring 25 in response to movement of coil spring 2 to the second position. The electrical circuit between terminal screw 48 and the indicator light would of course be modified so that movement of contactor 24 to the open position would energize the indicator light.

It will be apparent from the foregoing that the mounting plate 37 and components mounted thereon can be removed as a unit to facilitate replacement of the brush 14 without disturbing the first contactor 22 or the electrical lead 46 connected thereto. Further, since the bias of leaf spring 25 is exerted against the side of coil spring 32 the leaf spring 25 will not exert any side load to brush 14. Moreover since leaf spring 25 is simply freed to move second contactor 24 into contact with first contactor 22 as coil spring 32 moves to its second position the urging of brush 14 into operating contact with commutator 12 is not interferred with even after the indicator light is energized. This will allow the machine to operate without interruption and provide sufficient time to effect a brush change at a convenient time such as at the end of a work shift.

Other aspects, objects and advantages will become apparent from the study of the specification drawings and in the claims.

We claim:

1. In a brush wear indicator having a brush box connected to a insulator, a brush slidably connected to the brush box for translatory movement relative thereto, a mounting plate releasably connected to the brush box, and a spring connected to the mounting plate urging the brush in a preselected direction in response to wearing away of an end of the brush, the improvement comprising:

a first electrical contactor connected to the support structure;

a second electrical contactor connected to the mounting plate and movable relative to the first electrical contactor between a first position at which the second electrical contactor is free from contact with the first electrical contactor and a second position at which the second electrical contactor is in engagement with the first electrical contactor; and means connected to the mounting plate for biasing the second electrical contactor to a selected one of the first and second positions;

said spring being movable from a first position to a second position in response to the brush being worn away to a preselected shortened length, said second electrical contactor being maintained at the selected one of the first and second positions against the biasing influence of the biasing means by the spring at the first position of the spring and said second electrical contactor being moved to the other of the first and second positions by the biasing means when the spring reaches its second position.

2. The brush wear indicator of claim 1 wherein the brush box is electrically conductive, the first contactor being electrically insulated from the brush box.

3. The brush wear indicator of claim 1 wherein the spring is a self-winding coil spring and the biasing means includes a leaf spring connected to the mounting plate and having the second contactor connected thereto, the leaf spring being positioned at a location for abutment with the coil spring at the first position of the spring.

4. A brush wear indicator for providing an indication of when a brush slidably positioned within a brush box assembly has been worn away to a preselected length, comprising:

a first electrical contactor connected to the brush box assembly;

a second electrical contactor connected to the brush box assembly and movable relative to the first electrical contactor between a first position at which the second electrical contactor is free from contact with the first electrical contactor and a second position at which the second electrical contactor is in engagement with the first electrical contactor;

means connected to the brush box assembly for biasing the second electrical contactor to a selected one of the first and second positions; and a spring movable between a first position at which the spring maintains the second electrical contactor at the selected one of the first and second positions against the biasing influence of the biasing means and a second position at which the second electrical contactor is free to move to the other of the first and second positions under the influence of the biasing means, the spring being movable from the first position to the second position in response to the brush being worn away to the preselected length.

* * * * *